United States Patent [19]

Bao

[11] Patent Number: 5,705,780
[45] Date of Patent: Jan. 6, 1998

[54] DEHYDRATION OF HYDROGELS

[75] Inventor: Qi-Bin Bao, Livingston, N.J.

[73] Assignee: Howmedica Inc., New York, N.Y.

[21] Appl. No.: 459,574

[22] Filed: Jun. 2, 1995

[51] Int. Cl.$^6$ .............. C07C 1/00; C07C 2/00; C07C 4/00; C07C 5/00
[52] U.S. Cl. .............. 204/157.15; 524/916
[58] Field of Search .............. 204/157.15; 524/916; 424/422, 423; 623/17

[56] References Cited

U.S. PATENT DOCUMENTS

| | | | |
|---|---|---|---|
| 4,314,032 | 2/1982 | Murayamaa et al. | 521/52 |
| 5,012,503 | 4/1991 | Nambu et al. | 378/64 |
| 5,541,304 | 7/1996 | Thompson | 536/20 |

OTHER PUBLICATIONS

Crystallization Of Polyvinyl Alcohol–Water Films by Slow Dehydration, National Technical University of Athens, Department of Chemical Engineering, Athens, Greece; Dec. 4, 1975.
Volume change by solvent and temperature of poly (vinly alcohol) crosslinked by electron irradiation; 1993 Huthig & Wepf Verlag, Basel.
Effect of Gamma Irradiation on Thermal Properties of Poly (Vinyl Alcohol) Solutions; Journal of Applied Polymer Science, vol. 43, 1393–1395 (1991).
Structure and mechanical properties of poly (vinyl alcohol) gel swollen by various solvents; Polymer, 1992, vol. 33, No. 11.
Crystallization in Films of Polar Vinyl Polymers–I., European Polymer Journal, 1968, vol. 4, pp. 685–693.
Swelling and mechanical properties of polyvinylalcohol hydrogels; Polymer Bulletin 24, 613–618 (1990).

*Primary Examiner*—Kathryn L. Gorgos
*Assistant Examiner*—Alex Noguerda
*Attorney, Agent, or Firm*—Peter C. Richardson; Lawrence C. Akers; Elizabeth O. Slade

[57] ABSTRACT

A method of dehydration of bulky hydrogel samples of polyvinyl alcohol (i.e., PVA) and a method of preparation of prosthetic nuclei for vertebral discs are given. A method of gamma irradiation sterilization of PVA gel samples which does not incur the side effects of discoloration and of increased crystallinity (i.e., further reduction of water content) is also given.

A method of dehydrating bulky hydrogel samples of polyvinyl alcohol (i.e., PVA) so that no significant distortion in the samples results, comprises:

(a) subjecting the sample to a solvent system comprising at least one organic solvent which
   (1) has a solubility for PVA which is less than the solubility of water for PVA and
   (2) is miscible with water for a length of time generally from about 2 to about 10 days so that the dehydration rate of the hydrogel samples is sufficiently slow so as not to cause any distortions on the dehydrated samples.

17 Claims, 9 Drawing Sheets

Change solvent to 60 % at 2 Hours

Change solvent to 85 % at 92.5 hours

Change solvent to 100 % at 146.5 hours

Dehydration curve (100 % acetonitrile)

Change solvent to 30 % at 2 hours

Change solvent to 60 % at 28.5 hours

Change solvent to 85 % at 119 hours

Change solvent to 100 % at 167 hours

DEHYDRATION OF HYDROGELS

FIELD OF THE INVENTION

This invention relates generally to bulky hydrogels and to a method of dehydration of bulky hydrogel samples of polyvinyl alcohol (i.e., PVA) and relates in particular to a method of preparation of prosthetic nuclei for vertebral discs.

BACKGROUND OF THE INVENTION

An important area of research in the field of medical devices is the development of a prosthetic nucleus for a vertebral disc. In U.S. Pat. No. 5,047,055, a prosthetic nucleus for implantation in the disc space after the removal of a degenerated or damaged nucleus of an intervertebral disc is disclosed and claimed, as well as a method for forming the prosthetic nucleus. That patent is hereby incorporated herein by reference.

In making such a prosthetic nucleus for insertion, the implants made of bulky hydrogels should be dehydrated so that they have a water content as low as possible. This allows for easy insertion of the disc component during surgery due to the accompanying reduction in volume. Additionally, it is desirable for the implant to have no distortions (i.e., no concavities or dimplings formed therein) and it is desirable that the apparent volume of the implant be a minimum. Apparent volume is defined herein to be the volume that the disc would have if it had no concavities and is equal to the largest cross-section of the disc multiplied by the largest disc width. Furthermore, it is desirable that the implant have no sharp edges. It is especially important for an implant which is to be inserted percutaneously to have a minimum dehydrated volume.

However, it has been found that when the bulky hydrogels as disclosed in U.S. Pat. No. 5,047,055 are dehydrated so as to reduce the water content as low as possible, under certain conditions, gross distortions of the implants occur. These distortions may not be acceptable in the intended medical application. For example, sharp edges on the superior and inferior surfaces of the implants can cause damage on the end-plates of the natural disc.

Disclosed and claimed in copending case having U.S. Ser. No. 08/122,110 (and described below) is one method for dehydrating hydrogels so as to control conditions of relative humidity and temperature and minimize the deformation of the hydrogel samples during the dehydration process. This is especially important for producing prosthetic nuclear implants for insertion into vertebral discs so as to reduce the water contents of the implants as low as possible without distorting the implants, without forming concavities and sharp edges, and without changing the shape of the dehydrated implants.

An object of this invention is to provide an alternative method for dehydrating hydrogel samples while minimizing the deformation of the hydrogel samples during the dehydration process.

Yet another object of this invention is a method of dehydrating PVA hydrogel samples which has advantages over the method of dehydrating the hydrogel samples by controlling relative humidity and temperature in U.S. Ser. No. 08/122,110, one advantage including preservation of the rehydrating capability of the hydrogel samples (i.e., preservation of the crystallinity of the sample), while simultaneously achieving minimal deformation of the samples.

Yet another object of this invention is a method of gamma irradiation sterilization of PVA gel samples which does not incur the side effects of discoloration and of increased crystallinity (i.e., further reduction of water content).

SUMMARY OF THE INVENTION

These and other objects are satisfied by the method of the invention of dehydrating bulky hydrogel samples of polyvinyl alcohol (i.e., PVA) so that no significant distortion in the samples results, the method comprising:

(a) subjecting the sample to a solvent system comprising at least one organic solvent which
  (1) has a solubility for PVA which is less than the solubility of water for PVA and
  (2) is miscible with water for a length of time generally from about 2 to about 10 days so that the dehydration rate of the hydrogel samples is sufficiently slow so as not to cause any distortions on the dehydrated samples.

In a preferred embodiment, the solvent system consists of a single solvent selected from the group consisting of ethanol, methanol and ethylene glycol.

It has been found that for PVA hydrogel samples of sizes of about 5 to about 7 grams, in the shape of a natural vertebral disc, and having a surface/volume ratio of about 3.5, when the samples are dehydrated by a method comprising using a solvent system, as recited above, the dehydration rate must be strictly controlled in order to avoid deformation of the samples, but this control is required only when the water content of the PVA gel is within the critical range from about 75 to about 65 weight percent (hereinafter also abbreviated as w/o) water (hereinafter called the "critical range" of the water content). It is noted that this range is different from the critical range of the water content in the dehydration method which uses humidity and temperature control.

It is expected that larger size hydrogel samples will also benefit from this method of dehydration and will not experience any significant distortions.

Unexpectedly, it has been found that the dehydration rate can be quite fast in the method of this invention without distorting the samples when the water content of the PVA gel is outside the critical range (about 75 to about 65 weight percent water).

Also according to the invention, a method of dehydrating a PVA hydrogel sample so as to preserve the original shape of the PVA hydrogel sample and so as to preserve the rehydration capability of the sample (i.e., the ability of the sample to return to its original water content), without increasing the crystallinity of the sample being affected comprises:

when the water content of the PVA hydrogel sample is within the critical range from about 75 to about 65 weight percent water subjecting the sample to a solvent system comprising at least one organic solvent (1) which has a solubility for PVA which is less than the solubility of water for PVA and
(2) which is miscible with water, so as to provide a dehydration rate which is sufficiently slow so that no significant distortions occur. This will generally be at or below about 0.2 weight percent water content decrease per hour for samples of size of 5 to 7 grams.

Also according to the invention, a method of sterilizing samples of PVA gels by the use of gamma irradiation without incurring the side effects of discoloration and further reduction of water content, comprises: subjecting the PVA gel samples to the solvent dehydration method of the invention (as described above); and then (2) subjecting the dehydrated gel samples to gamma irradiation. It is believed that this sterilizing method is applicable to any shape and any size of dehydrated PVA gel samples.

DETAILED DESCRIPTION OF THE DRAWINGS

Figure 1:
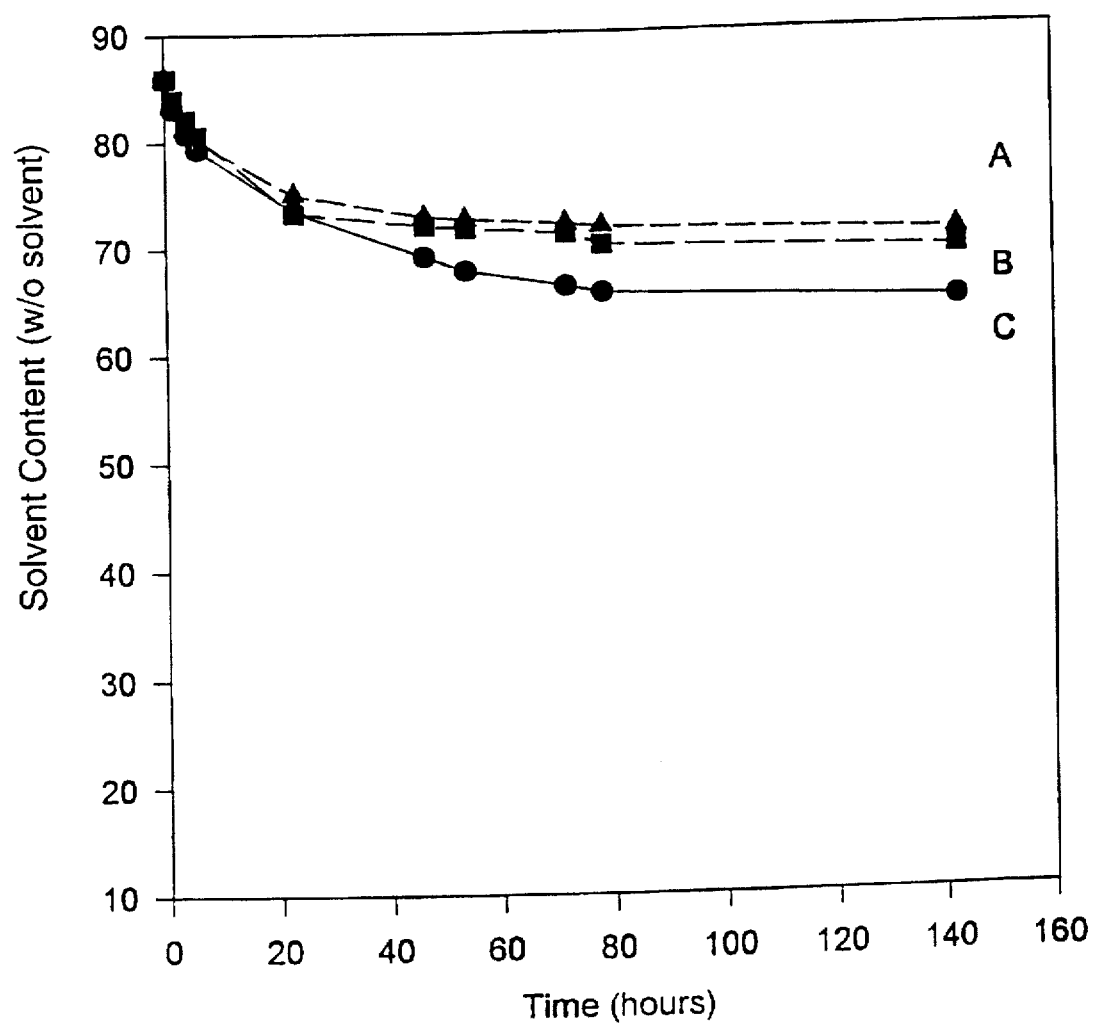
FIG. 1 shows dehydration curves for 100% ethanol, 100% methanol, and 100% ethylene glycol.

FIG. 1: A is a dehydration curve similar to that shown in C, but for a different solvent system of the invention (using 100% ethylene glycol). The particulars are disclosed in Example 1 for curves A, B, and C. No distortion of the dehydrated samples was observed (Invention).

B is a plot similar to C, but for a different solvent system of the invention (using 100% methanol). (Invention) See Example 1.

C is a dehydration curve for a solvent system of the invention in which 100% ethanol was used, displaying the solvent content (in weight percent solvent) of the sample versus the time of dehydration (in hours). (Invention) (See Example 1).

Figure 2:
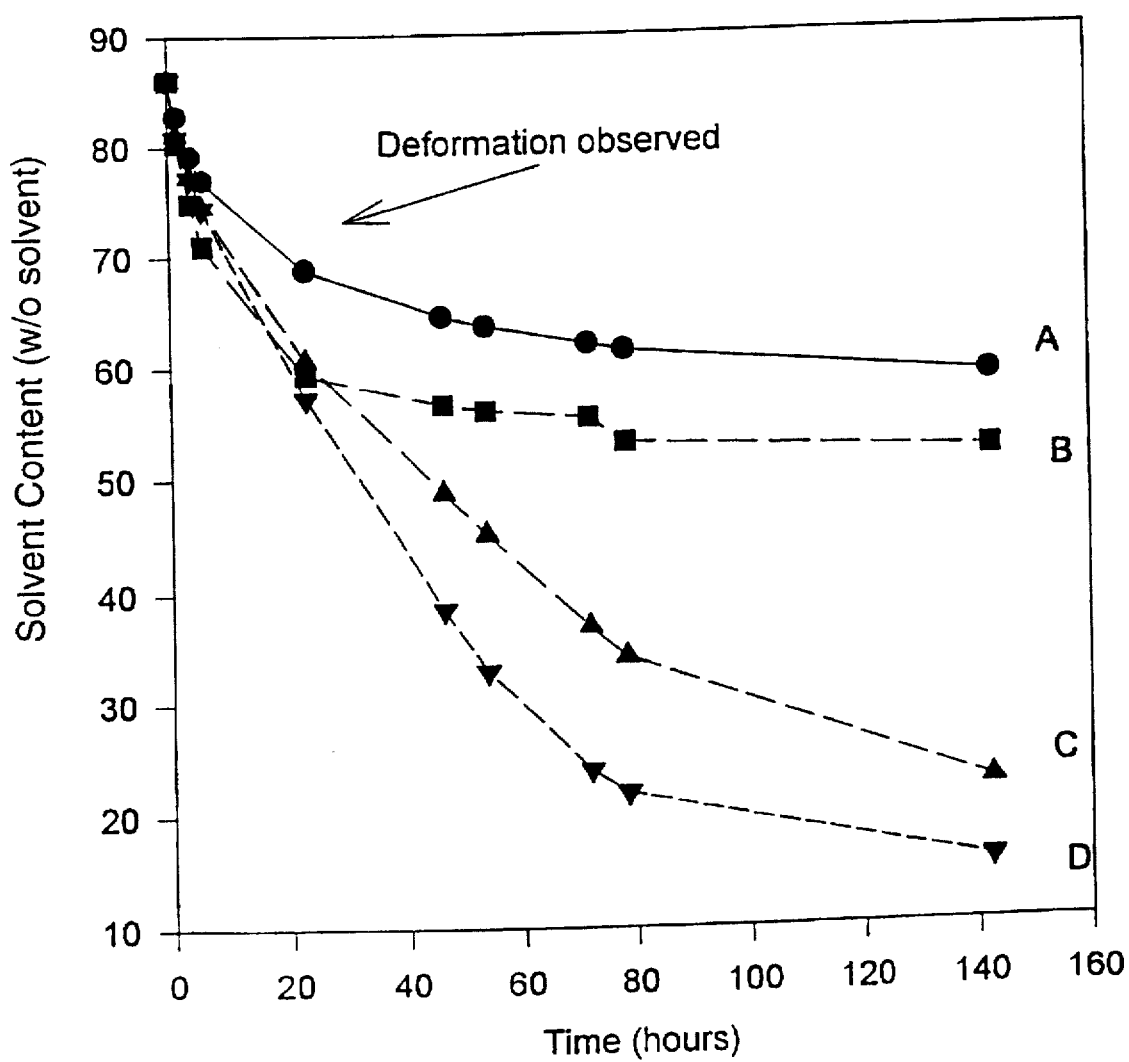
FIG. 2 shows dehydration curves for 100% glycerol, 100% 2-propanol, and 100% acetone.

FIG. 2: A is a dehydration curve similar to that described above for C in FIG. 1 but using 100% glycerol. The procedure used is described below in Example 2; and deformation of the dehydrated sample was observed (Control).

B is a dehydration curve for 100% acetone, the procedure for which is described below in Example 2. The dehydrated sample exhibited deformation (Control).

C is a dehydration curve for 100% 2-propanol, and the procedure used is described fully in Example 2. Deformation of the dehydrated sample was observed (Control).

D is a dehydration curve for 100% acetonitrile used as the solvent system; and the procedure used is described fully in Example 2. Deformation of the dehydrated sample was observed (Control).

Figure 3:
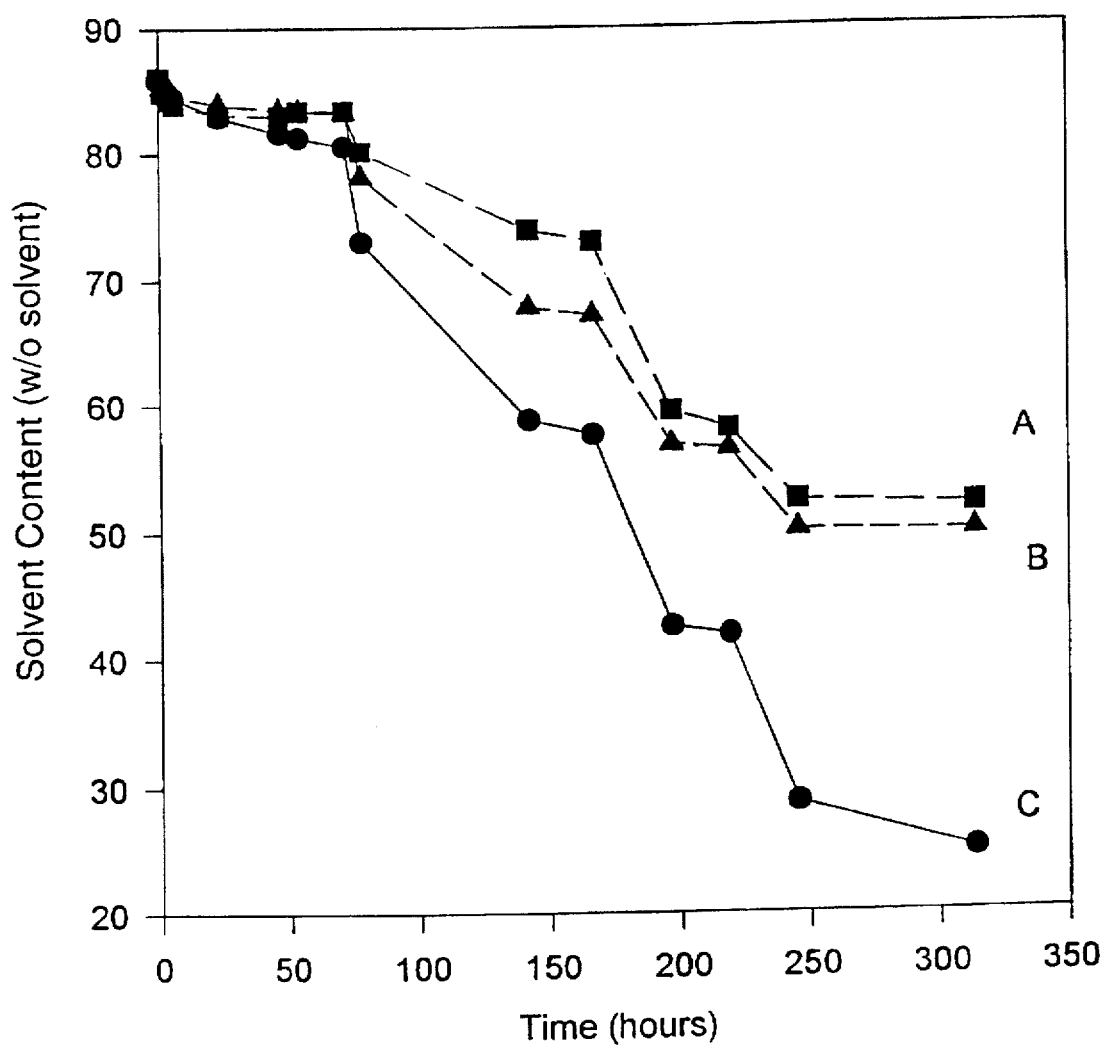
FIG. 3 shows dehydration curves for mixed solvent systems.

FIG. 3: A is a dehydration curve in which a PVA hydrogel sample was placed into an organic solvent system which was initially 30 weight percent 2-Propanol and 70 weight percent water, which was subsequently changed to 60 w/o 2-Propanol after 72 hours, 85 w/o 2-Propanol after 1 67 hours, and 1 00 w/o 2-Propanol after 219 hours. The procedure is described in Example 3; and no deformation in the dehydrated sample was observed (Invention).

B is a dehydration curve in which the initial organic solvent system was weight percent acetone and 70 weight percent water, which was subsequently changed to 60 w/o acetone after 72 hours, 85 w/o acetone after 167 hours, and 100 w/o acetone after 219 hours. The procedure is described in Example 3, and no deformation in the dehydrated sample was observed (Invention).

C is a dehydration curve for a PVA hydrogel sample in a solvent system of the invention which was initially 30 weight percent acetonitrile and 70 weight percent water, which was subsequently changed to 60 w/o acetonitrile after 72 hours and 85 w/o acetonitrile after 167 hours and 100 w/o acetonitrile after 219 hours. The procedure is described in Example 3, and no deformation of the dehydrated sample was observed (Invention).

Figure 4:
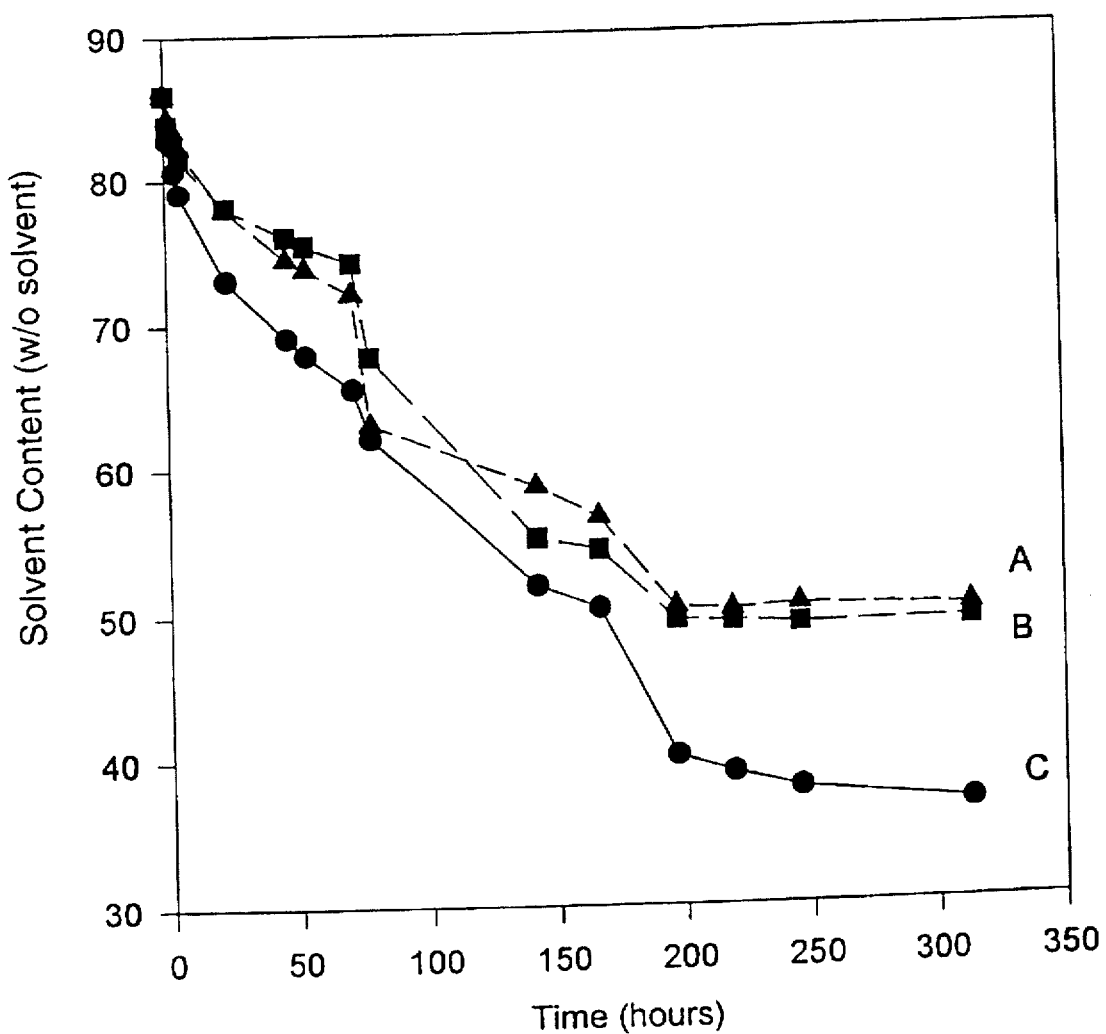
FIG. 4 shows dehydration curves for mixed solvent systems.

FIG. 4: A is a dehydration curve in which the initial organic solvent system was 60 weight percent acetone and 40 weight percent water, which was subsequently changed to 85 w/o acetone after 72 hours and 100 w/o acetone after 167 hours. The procedure is described in Example 3, and no deformation in the dehydrated sample was observed (Invention).

B is a dehydration curve in which a PVA hydrogel sample was placed into an initial organic solvent system which was 60 weight percent 2-Propanol and 40 weight percent water, which was subsequently changed to 85 w/o 2-Propanol after 72 hours and 100 w/o 2-Propanol after 167 hours. This procedure is described in Example 3; and no deformation in the dehydrated sample was observed (Invention).

C is a dehydration curve in which the initial organic solvent concentration was 60 weight percent acetonitrile and 40 weight percent water, which was subsequently changed to 85 w/o acetonitrile after 72 hours and 100 w/o acetonitrile after 167 hours. This is described in Example 3, and no deformation in the dehydrated sample was observed (Invention).

Figure 5:
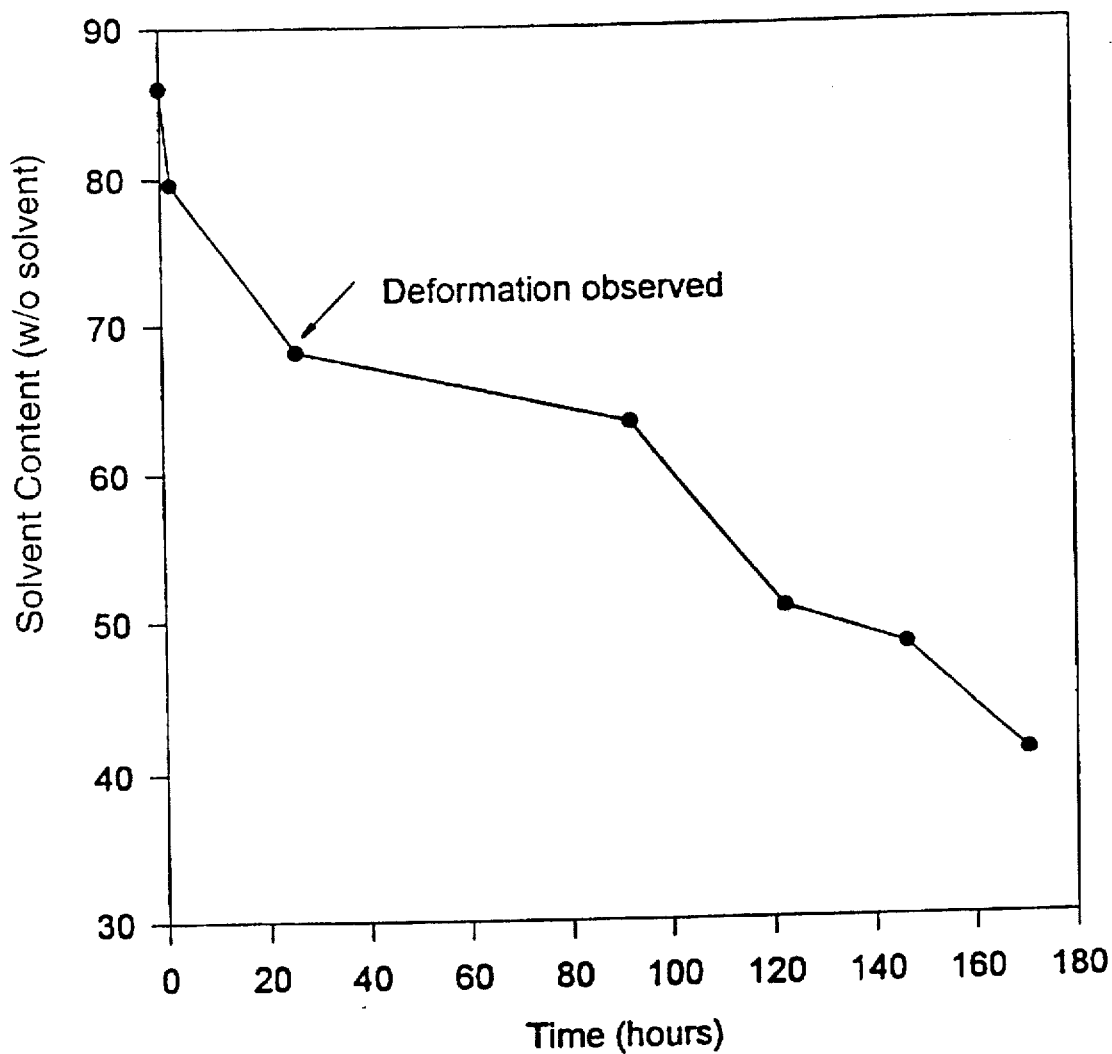
FIG. 5 shows a dehydration curve for a changed solvent system.

FIG. 5 is a dehydration curve in which a PVA hydrogel sample was placed into an initial organic solvent system of 100% acetonitrile, which was subsequently changed to 60 w/o acetonitrile after 2 hours, 85 w/o acetonitrile after 92.5 hours, and 100 w/o acetonitrile after 146.5 hours. Deformation of the dehydrated sample was observed (Control).

Figure 6:
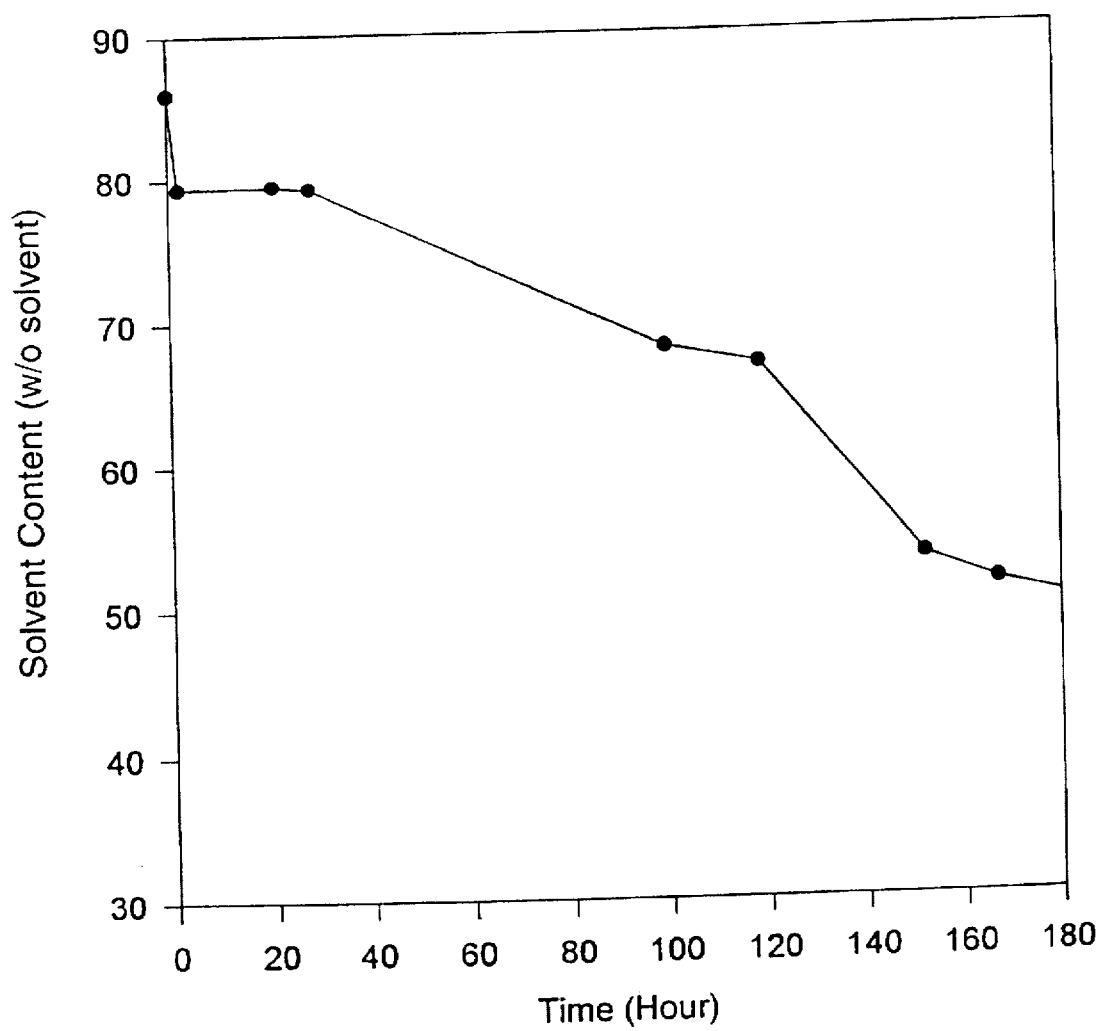
FIG. 6 shows a dehydration curve for a changed solvent system.

FIG. 6 is a dehydration curve in which a PVA hydrogel sample was placed into an initial organic solvent system of 100% acetonitrile, which was subsequently changed to 30 w/o acetonitrile after 2 hours, 60 w/o acetonitrile after 28.5 hours, 85 w/o acetonitrile after 119 hours, and 100 w/o acetonitrile after 167 hours. No distortion was observed. (Invention)

Figure 7:
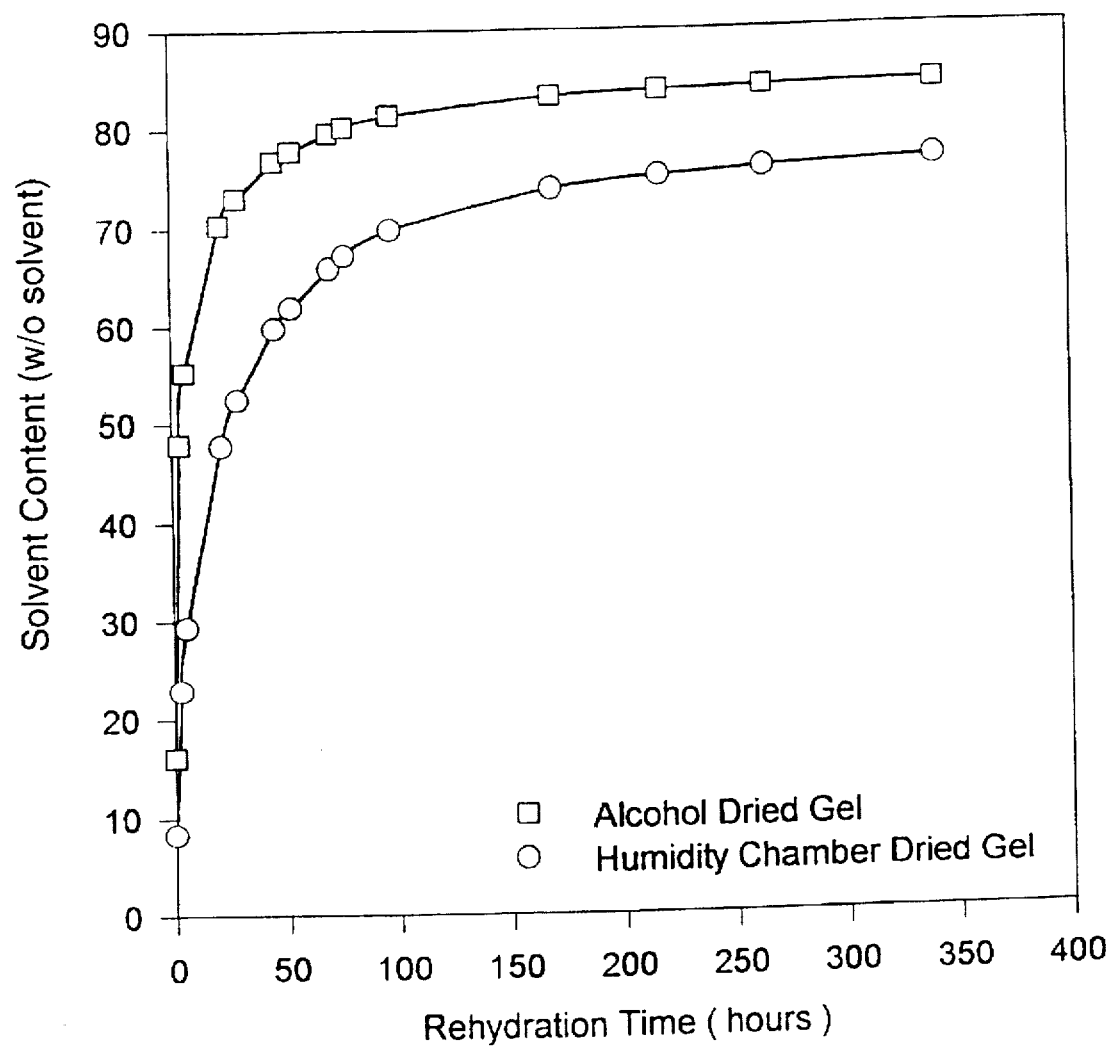
FIG. 7 shows comparative rehydration data.

FIG. 7 is a graph of rehydration, comparing rehydration of PVA gel samples dried in ethanol as compared with samples dried in a humidity controlled chamber. Water content of the samples is plotted versus rehydration time in hours.

Figure 8:
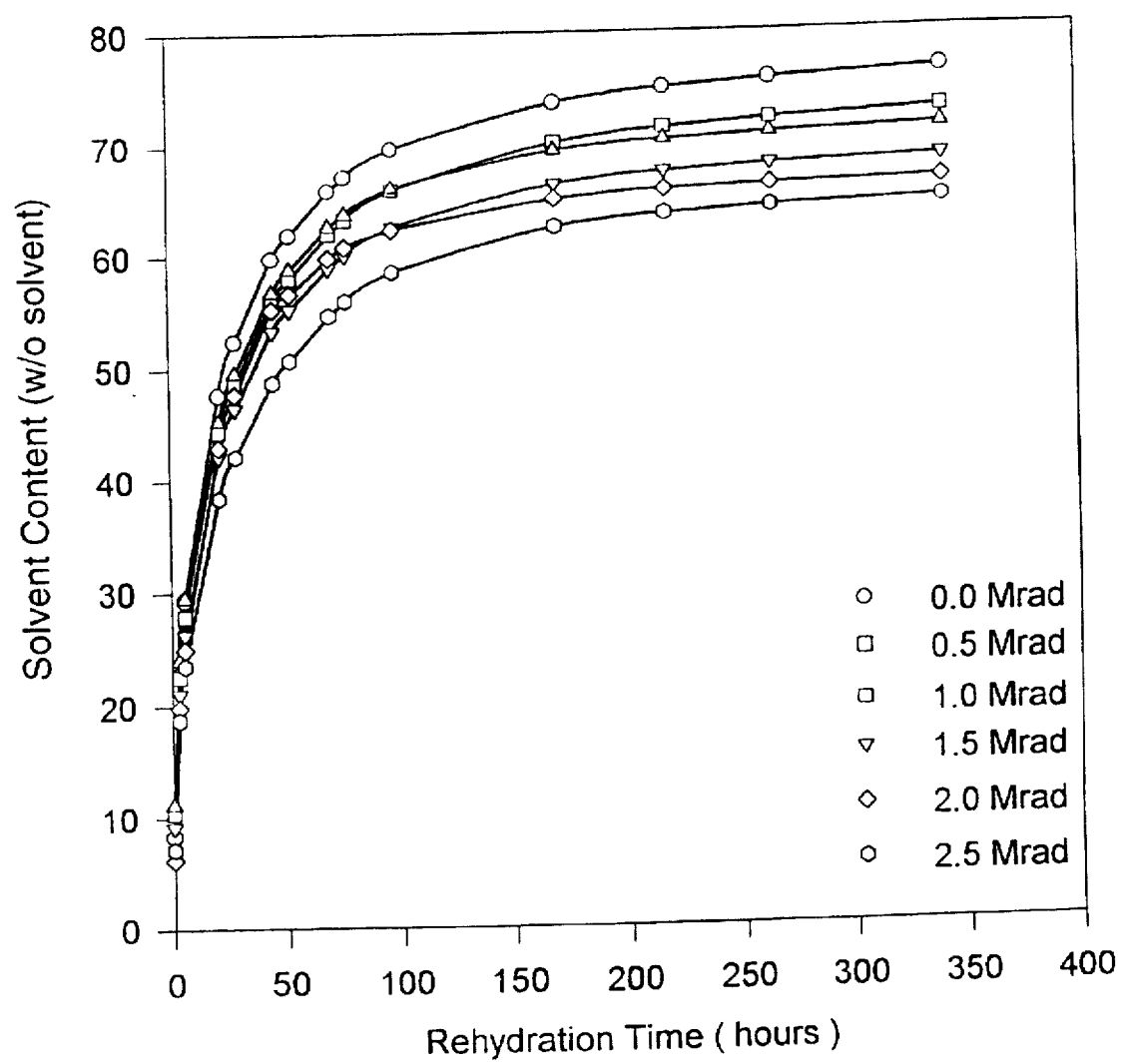
FIG. 8 shows water content versus rehydration time.

FIG. 8 is a graph of the water content in weight percent of PVA gel samples versus rehydration time in hours for samples subjected to various exposures of gamma irradiation, including 0.0 Mrad, 0.5 Mrad, 1.0 Mrad, 1.5 Mrad, 2.0 Mrad, and 2.5 Mrad.

Figure 9:
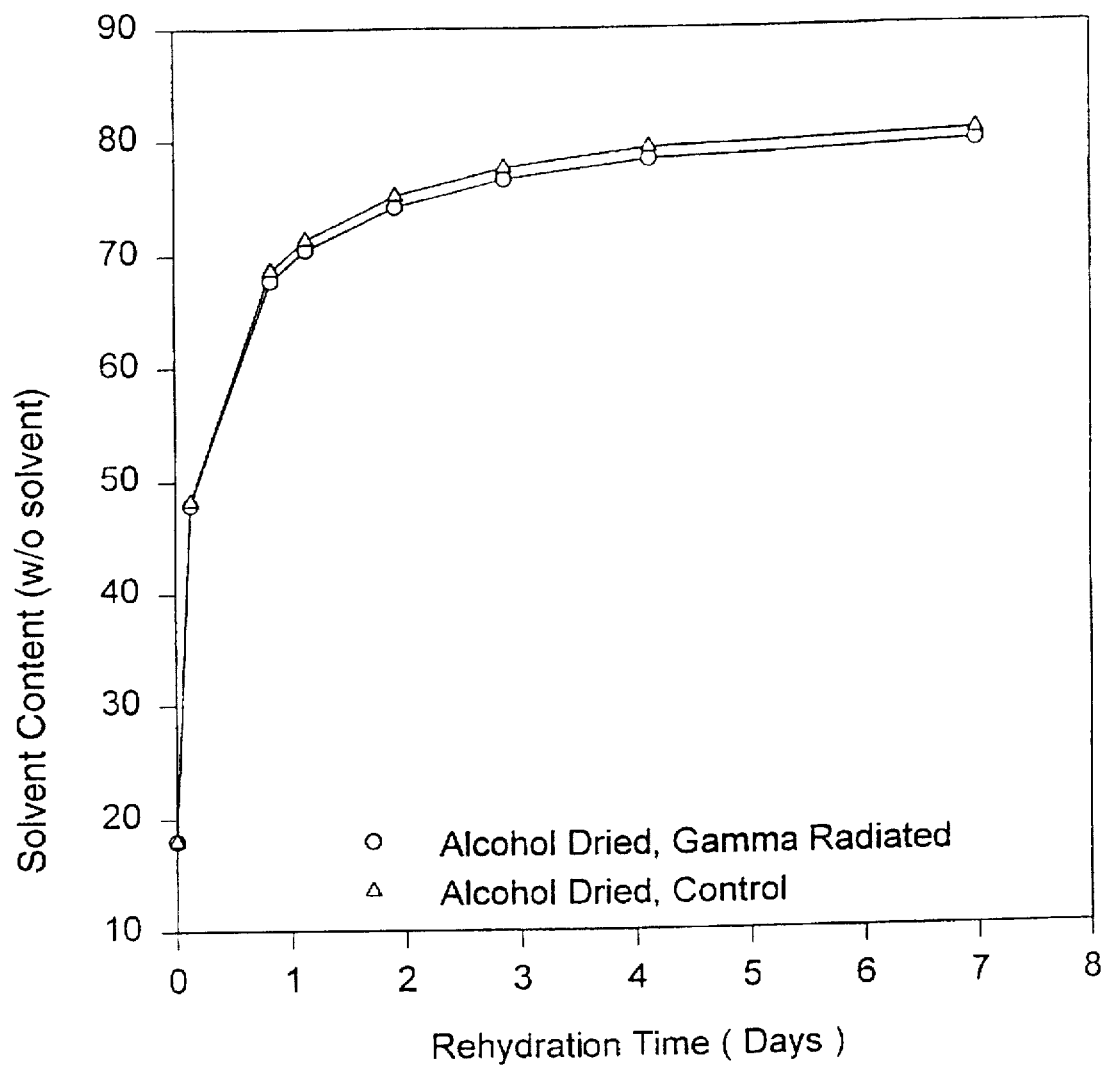
FIG. 9 is a rehydration graph.

FIG. 9 is a graph of rehydration, comparing rehydration of PVA gel samples dried in ethanol with and without gamma irradiation.

DETAILED DESCRIPTION OF THE PREFERRED EMBODIMENTS

In the practice of the invention, a PVA hydrogel sample is dehydrated by immersing that sample in certain organic solvent systems without resulting in a deformation of the original shape of the PVA hydrogel. Although reports have been published about dehydration of PVA gels immersed in certain organic solvents and about changes in the polymer fraction in those gels, it has not previously been a goal to preserve the original shape of the PVA hydrogel samples in those organic solvents. Therefore, a solution to the problem of deformation of samples of PVA hydrogels has not previously been sought and has not previously been known in the art.

Now it has been discovered that by using particular solvent systems for dehydrating the hydrogel samples, one can dehydrate these PVA hydrogel samples without appreciably distorting the samples. This is especially important for providing a prosthetic nucleus for a vertebral disc. Additionally, several other advantages are obtained by use of such a particular solvent system. Such advantages include advantages over PVA hydrogel samples which have been dehydrated by use of a humidity chamber dehydration method, as disclosed and claimed in copending U.S. patent application Ser. No. 08/122,110, in which an alternative method is disclosed for dehydrating a bulky PVA hydrogel nuclear vertebral implant which weighs before dehydration between about 3 and about 10 grams and which has a shape substantially in the shape of a kidney. The method in that case comprises: when the water content of the implant is within the critical range from about 30 to about 60 percent by weight, dehydrating the implant at (a) a relative humidity of at least about 80 percent, (b) at a drying temperature within the range from about 10° to about 40° centigrade, and (c) for a time of drying of several days. In the present invention, where an organic solvent system is used, one advantage over that alternative method of dehydration (using humidity chamber and air drying) is that here one retains both the original shape of the implant and the rehydration capability of that sample. That is, after the implants have been dehydrated by the solvent system method, one can rehydrate the samples substantially back to their original level of hydration, (whereas for those samples dehydrated by use of the humidity chamber and air drying method, the rehydration capability of these samples is reduced and they are not able to be rehydrated back to their original level of hydration). Yet another advantage of the samples dehydrated by use of the organic solvent system method over the air and humidity chamber dehydration method is that when the dehydrated samples of the present invention are later subjected to gamma irradiation, they do not experience the side effects of discoloration and further reduction of water content (i.e., their crystallinity is not increased), as in samples which have been dehydrated by use of the humidity chamber and air dehydration method. In the latter method, the samples become discolored and their water content is further reduced when they are subjected to the step of gamma irradiation sterilization. It is believed that this advantage of the present invention obtains for any shape and any size of samples of PVA.

As stated above, it is known in the art to use an organic solvent, for example alcohol, to dehydrate hydrogels; however, maintaining the shape of the hydrogels has not been a concern in the art.

In the practice of the invention, the following organic solvent systems are suitable for use.

A single organic solvent can be used provided that the solvent has a solubility for PVA (polyvinyl alcohol) which is less than the solubility of water for PVA, provided that the solvent is miscible with water, and provided that any chosen mixture of water and the chosen organic solvent has a solubility for PVA which is less than the solubility of water for PVA. Suitable examples include ethanol, methanol, and ethylene glycol (which are supported by the examples below). It is expected that other solvents which are similar in solubility properties to those solvents of the Invention Examples used singly or as a mixture with water will also give similar good results.

Alternatively, a mixture of the suitable single organic solvents described above can be used; and any such mixture can be either mixed with water or not, as desired.

Alternatively, acetonitrile, 2-propanol, acetone, glycerol and any mixture thereof can be used as the solvent system, so long as the solvent is mixed with water sufficient to provide an organic solvent concentration less than or equal to about 60 weight percent organic solvent in water.

EXAMPLES

All of the PVA hydrogel nucleus implants (which have a relatively high water content) were made by the method disclosed in U.S. Pat. No. 4,663,358, which is hereby incorporated herein by reference. However, any suitable method can be used.

The concentrations of all of the mixed solvents are calculated based on weight perentages. For example, if 30 g. of solvent is mixed with 70 g. of water, this will be 30 w/o solvent.

Example 1 (Invention) FIGS. 1A, 1B, 1C

A PVA hydrogel nucleus implant of initial water content 86% and with weight about 6–7 grams was dehydrated in each of the following solvents: Ethanol, Methanol and Ethylene Glycol. The weight of these nucleus implants was monitored and the solvent content for each implant at different stages was calculated and plotted in FIGS. 1A, 1B, 1C. After 140 hours, the implants were further dehydrated in air under ambient conditions. No distortion was observed in any of these implants.

Example 2 (Control) FIGS. 2A, 2B, 2C, 2D

A PVA hydrogel nucleus implant of initial water content 86% and with weight about 6–7 grams was dehydrated in each of the following pure (unmixed) solvents; Glycerol, Acetone, 2-Propanol and Acetonitrile. The weight of these nucleus implants was monitored and the solvent content for each implant at different stages was calculated and plotted in FIGS. 2A, 2B, 2C, 2D. Distortion or forming concavities on the surface was observed in each of these four implants during the dehydration. The degree of distortion for the implants in these four solvents was in the order:

Acetonitrile→2-Propanol→Acetone→Glycerol, which also is the same order as the dehydration rate in these solvents.

Example 3 (Invention)

The solvents with the three highest dehydration rates in Example 2 (i.e., Acetone, 2-Propanol, and Acetonitrile) were selected and mixed with water to get initial organic solvent concentrations of 30 weight percent (w/o) and 60 w/o in an attempt to reduce the dehydration rate. A PVA hydrogel nucleus implant of initial water content 86% and weight about 6–7 grams was dehydrated in each of these six solutions. The organic solvent concentration was increased to 60 w/o, and to 85 w/o, and then 100 w/o for the solutions with initial concentration of 60 w/o. The weight of the implants in each solution was monitored at different stages and the solvent concentrations were calculated and plotted in FIGS. 3A, 3B, 3C, 4A, 4B, 4C. No distortion was noticed in any of these implants.

Example 4 (Control)

A PVA hydrogel nucleus implant of initial water content 86 w/o and with weight about 6–7 grams was first dehydrated in 100 w/o Acetonitrile for 2 hours. The hydrogel lost about one-third of its initial weight during this 2 hour period, and the solvent content was reduced to 79 w/o from 86 w/o. No distortion was noticed at that point. Then the semi-dehydrated hydrogel implant was immersed in a 60 w/o Acetonitrile solution. Although at a slower rate, the weight of the gel still decreased further even in 60 w/o solution. It developed some distortion on the gel after 24 hours. The weight of the implant was monitored and the solvent content for the gel at different stages was calculated and plotted in FIG. 5.

Example 5 (Invention)

A PVA hydrogel nucleus implant of initial water content 86 w/o and with weight about 6–7 grams was first dehydrated in 100 w/o Acetonitrile for 2 hours. The hydrogel lost about one-third of its initial weight during this 2 hour period and solvent content was reduced to 79 w/o from 86 w/o. No distortion was noticed at that point. Then the semi-dehydrated hydrogel implant was immersed in a 30 w/o Acetonitrile solution. Since the equilibrium solvent content for a 86 w/o water content PVA hydrogel in 30 w/o Acetonitrile is about 80% as can be seen from FIG. 3C in Example 3, the PVA hydrogel gained some weight during this period. After a couple of days, the gel was placed into a 60 w/o Acetonitrile solution, and then into 85 w/o and 100 w/o Acetonitrile solutions. No distortion was observed in the whole period. The solvent content vs. time is plotted in FIG. 6.

Example 6

A PVA hydrogel of initial water content of 88 w/o was dehydrated in a humidity controlled chamber at 35° C. and 98% relative humidity (RH). After the water content decreased to 40 w/o, the gel was further dried under ambient conditions and then under vacuum. Another PVA hydrogel of the same size and initial water content was dehydrated in an Ethanol solution of 100 w/o. After the solvent content decreased to about 65 w/o, it was further dried in air and then in vacuum. Both gels had no distortion on their surfaces. After drying, both gels were rehydrated in water at room temperature. Their weights were monitored and water contents were calculated and plotted in FIG. 7. The water content of the humidity controlled gel is about 5 to about 10 w/o less than the Ethanol dehydrated gel, indicating a reduction of the rehydration capability of the humidity controlled gel.

Example 7

Dry PVA gels of 1 gram which had been dehydrated in a humidity controlled chamber (35° C. and 98% RH) were exposed to different doses of gamma irradiation, 0.0 Mrad (control) , 0.5 Mrad, 1.0 Mrad, 1.5 Mrad, 2.0 Mrad and 2.5 Mrad. All the gamma irradiated gels turned slightly yellow in color after gamma irradiation as compared to the control gel. These gels were rehydrated and their rehydration curves are shown in FIG. 8. It is clear that increasing the gamma dose decreased the gel rehydration capability. Also, two PVA hydrogel samples of 6 grams were dehydrated in Ethanol solution of 100 w/o. One was exposed to 2.5 Mrad gamma irradiation and the other one was exposed to no radiation (control). No yellow color was noticed on the gel with gamma irradiation nor on the control. Both gels were rehydrated in water at room temperature and their weights were monitored. As plotted in FIG. 9, gamma irradiation had only a very minor effect on the gel rehydration capability of gels dehydrated in an Ethanol solution of 100 w/o Ethanol.

This invention is not to be limited to the Examples described above.

I claim:

1. A method of dehydrating a bulky hydrogel sample of polyvinyl alcohol (PVA) so that no significant distortion in the sample results, said method comprising subjecting said bulky hydrogel sample which has already been formed to a solvent system comprising at least one organic solvent
   (1) having a solubility for PVA which is less than the solubility of water for PVA and
   (2) being miscible with water and
   (3) being such that any mixture of water and said organic solvent has a solubility for PVA less than the solubility of water for PVA,
   wherein the water content of the PVA hydrogel sample is within the critical range from about 75 to about 65 weight percent water, and the dehydration rate is sufficiently slow so that no significant distortions occur.

2. A method according to claim 1, wherein said at least one organic solvent consists essentially of a solvent selected from the group consisting of ethanol, methanol, ethylene glycol, and mixtures thereof and wherein the dehydration rate is at or below about 0.2 weight percent water content decrease per hour.

3. A method according to claim 2, wherein said solvent system consists of a single solvent selected from the group consisting of ethanol, methanol and ethylene glycol.

4. A method according to claim 2, wherein said sample size before dehydration is within the range from about 6 to about 7 grams.

5. A method according to claim 4, wherein said water content before dehydration of said sample is about 86 weight percent water.

6. A method according to claim 5, wherein said sample is subjected to dehydration by use of an organic solvent system for a time period within the range from about 2 to about 10 days.

7. A method according to claim 6, wherein said sample has a surface area to volume ratio within the range from about 2.5 to about 5.

8. A method according to claim 1, wherein said at least one organic solvent is selected from the group consisting of acetonitrile, 2-propanol, acetone and glycerol, and mixtures thereof and wherein said at least one organic solvent is mixed with water so as to provide an initial organic solvent concentration less than or equal to about 60 weight percent organic solvent in water, for a period of time of at least about 2 days, for a sample size of about 6 to about 7 grams, and for a PVA hydrogel nucleus implant of initial water content within the range from about 75 to about 65 weight percent water.

9. A method of dehydrating a polyvinyl alcohol (PVA) hydrogel sample so as to preserve the original shape of said sample and so as to preserve the rehydration capability of said sample, that is, the ability of the sample to return to its original water content and thus not to have its crystallinity affected, said method comprising
   wherein the water content of the PVA hydrogel sample which has already been formed is within the critical range from about 75 to 65 weight percent water,
   subjecting said sample to a solvent system comprising at least one organic solvent (1) having a solubility for PVA which is less than the solubility of water for PVA and (2) being miscible with water, for a length of time from about 2 to about 10 days, so as to produce a dehydration rate sufficiently slow so that no significant distortions occur.

10. A method according to claim 9, wherein said at least one organic solvent consists essentially of a solvent selected from the group consisting of ethanol, methanol, ethylene glycol, and mixtures thereof and wherein the dehydration rate is at or below about 0.2 weight percent water content decrease per hour.

11. A method according to claim 10, wherein said solvent system consists of a single solvent selected from the group consisting of ethanol, methanol and ethylene glycol.

12. A method according to claim 11, wherein said at least one organic solvent is selected from the group consisting of acetonitrile, 2-propanol, acetone and glycerol, and mixtures thereof and wherein said at least one organic solvent is mixed with water so as to provide an initial organic solvent concentration less than or equal to about 60 weight percent organic solvent in water, for a period of time of at least about 2 days, for a sample size of about 6 to about 7 grams, and for a PVA hydrogel nucleus implant of initial water content within the range from about 75 to about 65 weight percent water.

13. A method according to claim 12, wherein said sample size initially (before dehydration) is within the range from about 6 to about 7 grams.

14. A method according to claim 13, wherein said original water content before dehydration of said sample is about 86 weight percent water.

15. A method according to claim 14, wherein said sample is subjected to dehydration by use of an organic solvent system for a time period within the range from about 2 to about 10 days.

16. A method according to claim 15, wherein said sample has a surface to volume ratio within the range from about 2.5 to about 5.

17. A method of subjecting a sample of polyvinyl alcohol (PVA) gel to sterilization by gamma ray irradiation without the sample incurring the side effects of discoloration and further reduction of its water content and increased crystallinity, said method comprising (1) subjecting said polyvinyl alcohol sample which has already been formed to the method of claim 1, so as to produce a dehydrated gel sample dehydrated by the solvent system method; and (2) then subjecting said dehydrated gel sample to gamma ray irradiation.

* * * * *